United States Patent
Zhou

(10) Patent No.: US 10,838,241 B1
(45) Date of Patent: Nov. 17, 2020

(54) PANEL SOUNDING DISPLAY DEVICE

(71) Applicant: WUHAN CHINA STAR OPTOELECTRONICS TECHNOLOGY CO., LTD., Hubei (CN)

(72) Inventor: Yongxiang Zhou, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/609,212

(22) PCT Filed: Aug. 21, 2019

(86) PCT No.: PCT/CN2019/101823
§ 371 (c)(1),
(2) Date: Oct. 29, 2019

(30) Foreign Application Priority Data

Jun. 17, 2019 (CN) .......................... 2019 1 0519497

(51) Int. Cl.
| | |
|---|---|
| *G02F 1/1333* | (2006.01) |
| *B06B 1/06* | (2006.01) |
| *G02F 1/1335* | (2006.01) |
| *G02F 1/1368* | (2006.01) |
| *H04R 17/00* | (2006.01) |
| *G06F 3/041* | (2006.01) |
| *H04R 1/02* | (2006.01) |
| *G02F 1/1343* | (2006.01) |

(52) U.S. Cl.
CPC .......... *G02F 1/1333* (2013.01); *B06B 1/0688* (2013.01); *G02F 1/1368* (2013.01); *G02F 1/13338* (2013.01); *G02F 1/133512* (2013.01); *G06F 3/0412* (2013.01); *H04R 1/028* (2013.01); *H04R 17/00* (2013.01); *G02F 1/133514* (2013.01); *G02F 1/134363* (2013.01); *G02F 2001/13685* (2013.01); *G02F 2001/133394* (2013.01); *H04R 2499/15* (2013.01)

(58) Field of Classification Search
CPC ..................................................... G02F 1/1333
See application file for complete search history.

(56) References Cited

U.S. PATENT DOCUMENTS

| | | | |
|---|---|---|---|
| 2002/0011986 A1* | 1/2002 | Hasegawa ............. | B06B 1/0688 345/108 |
| 2002/0135708 A1 | 9/2002 | Murden et al. | |
| 2007/0019134 A1 | 1/2007 | Park | |
| 2015/0009425 A1 | 1/2015 | Kwon et al. | |
| 2015/0336132 A1* | 11/2015 | Amano ............. | H01L 29/78684 310/317 |
| 2017/0017112 A1* | 1/2017 | Ye ..................... | G02F 1/136209 |
| 2017/0146841 A1 | 5/2017 | Wang et al. | |

(Continued)

FOREIGN PATENT DOCUMENTS

| | | |
|---|---|---|
| CN | 1459043 A | 11/2003 |
| CN | 104952370 A | 9/2015 |

(Continued)

*Primary Examiner* — Sang V Nguyen
(74) *Attorney, Agent, or Firm* — Mark M. Friedman

(57) ABSTRACT

A panel sounding display device including a display panel and a vibrating layer disposed within a display region of the display panel. The vibrating layer is used for vibrating the display panel to emanate sounds.

13 Claims, 3 Drawing Sheets

(56) References Cited

U.S. PATENT DOCUMENTS

| | | | | |
|---|---|---|---|---|
| 2017/0155038 A1* | 6/2017 | Caraveo | | B81C 1/0015 |
| 2018/0348816 A1* | 12/2018 | Lee | | G06F 1/1605 |
| 2019/0163234 A1* | 5/2019 | Kim | | G06F 1/1637 |
| 2019/0243498 A1* | 8/2019 | Wang | | G06F 3/047 |
| 2019/0349685 A1* | 11/2019 | Choi | | H04R 1/028 |
| 2020/0019267 A1* | 1/2020 | Maruyama | | G06F 3/0412 |
| 2020/0042117 A1* | 2/2020 | Li | | G06F 3/0412 |

FOREIGN PATENT DOCUMENTS

| | | | | |
|---|---|---|---|---|
| CN | 108370475 A | | 8/2018 | |
| CN | 109068245 A | | 12/2018 | |
| CN | 109492462 | * | 3/2019 | ............... G06K 9/00 |
| CN | 109841653 A | | 6/2019 | |
| EP | 2821844 B1 | | 4/2018 | |

\* cited by examiner

PANEL SOUNDING DISPLAY DEVICE

FIELD OF INVENTION

The present invention relates to afield of display panel technology, and more particularly relates to a panel sounding display device.

BACKGROUND OF INVENTION

With development of electronic technology and improvement of manufacturing processes, full-screen panels have become mainstream nowadays. An obstacle in development of screen-to-body ratio of mobile phones is that essential components such as an earpiece sensor must be disposed on an upper side of the panel. To overcome the obstacle, panel sounding technology was developed. Currently, in conventional panel sounding technology, vibrating layer (activating layer) is disposed under a display panel. However, it apparently increases thickness of an entire module, compromising thinness of the entire module and causing many problems during assembly of phones.

An embodiment of the present invention provides a panel sounding display device. A vibrating layer is embedded into the display panel, which addresses the issue of the conventional panel sounding technology that disposes the vibrating layer under a display panel and apparently increases thickness of an entire module, compromising thinness of the entire module.

SUMMARY OF INVENTION

To solve the above problem, technical solutions provided by the present invention are described as follows:

An embodiment of the present invention provides a panel sounding display device including a display panel and a vibrating layer disposed within a display region of the display panel. The vibrating layer is used for vibrating the display panel to emanate sounds.

In the panel sounding display device provided by an embodiment of the present invention, the vibrating layer includes a plurality of vibrating units arranged in an array.

In the panel sounding display device provided by an embodiment of the present invention, the display panel includes a color filter, and the color filter includes a plurality of color resists arranged in an array and a plurality of black matrices. Each of the black matrices is disposed between each adjacent pair of the color resists. Each of the vibrating units is disposed between each adjacent pair of the color resists and is disposed on the same side as the black matrices.

In the panel sounding display device provided by an embodiment of the present invention, a projection of the black matrices in a direction perpendicular to the color filter covers a projection of the vibrating layer in a direction perpendicular to the color filter.

In the panel sounding display device provided by an embodiment of the present invention, the display panel includes a thin film transistor (TFT) array layer, and the TFT array layer includes a gate electrode layer. Each of the vibrating units is disposed on the TFT array layer and is corresponding to the gate electrode layer.

In the panel sounding display device provided by an embodiment of the present invention, a projection of the gate electrode layer in a direction perpendicular to the TFT array layer covers a projection of the vibrating layer in a direction perpendicular to the TFT array layer.

In the panel sounding display device provided by an embodiment of the present invention, the TFT array layer includes a substrate, a TFT, a pixel electrode layer, a planarization layer, and a common electrode layer which are sequentially disposed on each other. Each of the vibrating units is disposed on the common electrode layer.

In the panel sounding display device provided by an embodiment of the present invention, the display panel includes a thin film transistor (TFT) array layer and a color filter which are disposed corresponding to each other. The vibrating layer is disposed on a side of the color filter away from the TFT array layer. Material of the vibrating layer is a transparent material.

In the panel sounding display device provided by an embodiment of the present invention, the display panel further includes a liquid crystal layer disposed between the TFT array layer and the color filter, a top polarizer disposed on the color filter, a protective glass disposed on the top polarizer, and a touch control layer. The color filter is disposed on the liquid crystal layer, and the vibrating layer is disposed on the color filter. The touch control layer is integrated inside the protective glass, or the touch control layer is disposed between the vibrating layer and the top polarizer, or the touch control layer is embedded into the liquid crystal layer.

In the panel sounding display device provided by an embodiment of the present invention, the vibrating layer includes a sub-activating layer, and the sub-activating layer includes a plurality of sub-electrode layers. A sub-piezoelectric layer is disposed between each adjacent pair of the sub-electrode layers.

In the panel sounding display device provided by an embodiment of the present invention, the vibrating layer further includes a sub-insulating layer, and the sub-activating layer is disposed on the sub-insulating layer.

In the panel sounding display device provided by an embodiment of the present invention, a plurality of through holes are defined in a middle portion of the sub-insulating layer. A side of the vibrating layer near the sub-insulating layer is attached to a functional layer of the display panel to seal the through holes to form a cavity.

In the panel sounding display device provided by an embodiment of the present invention, material of the sub-piezoelectric layer is lead zirconate titanate, aluminum nitride, polyvinylidene fluoride, or a polyvinylidene fluoride trifluoroethylene copolymer.

In the panel sounding display device provided by an embodiment of the present invention, material of the sub-electrode layer is metal or indium tin oxide.

Regarding beneficial effects of the present invention, a panel sounding display device is provided. A vibrating layer is embedded into a display panel. Compared to a convention method that disposing the vibrating layer under a display panel, a panel sounding structure provided by the present invention does not need to provide a space for the vibrating layer. Therefore, thickness of the whole display panel is apparently reduced, and assembly of the display panel will not be influenced. In addition, performance of the panel sounding display device can be further improved by embedding the vibrating layer into the display panel.

DESCRIPTION OF DRAWINGS

The accompanying figures to be used in the description of embodiments of the present disclosure or prior art will be described in brief to more clearly illustrate the technical solutions of the embodiments or the prior art. Apparently, the accompanying figures described below are only part of the embodiments of the present disclosure, from which figures those skilled in the art can derive further figures without making any inventive efforts.

DETAILED DESCRIPTION OF PREFERRED EMBODIMENTS

Figure 1:
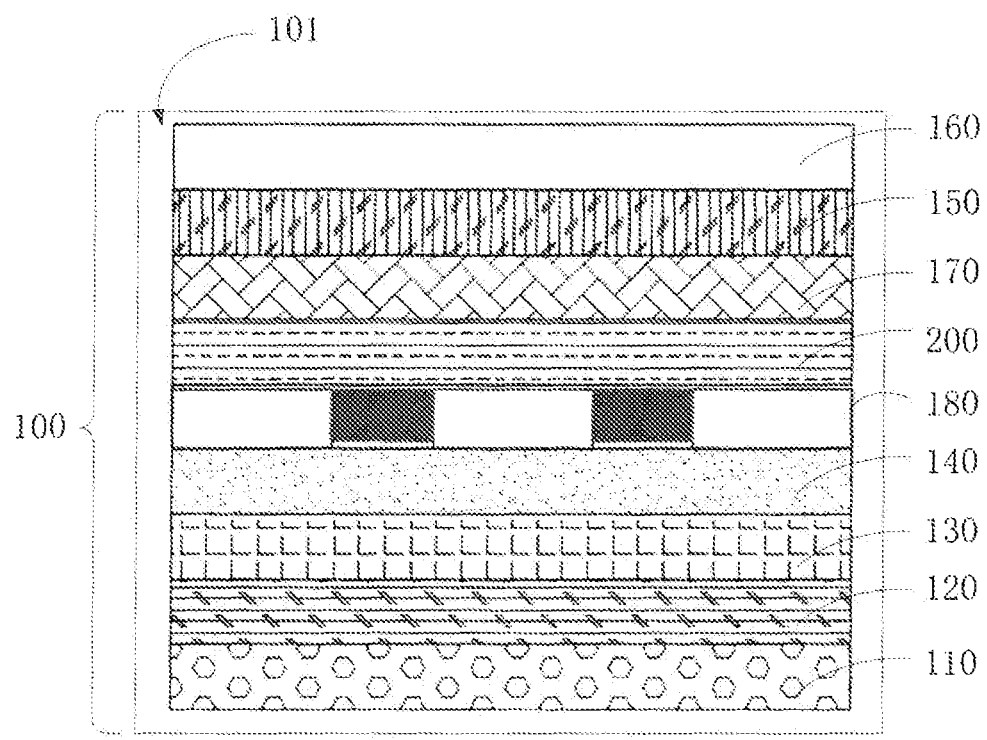
FIG. 1 is a schematic structural diagram of a panel sounding display device provided by an embodiment of the present invention.

The specific structures and detail functions disclosed herein are merely representative and are for purposes of describing exemplary embodiments of the present invention. However, the present invention may be embodied in many alternative forms and should not be construed as being limited to the embodiments set forth herein.

In the description of the present disclosure, it should be understood that terms such as "lateral," "upper," "left," "right, vertical," "horizontal," "top," "bottom," "inside," "outside," "clockwise," "counter-clockwise" as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two, unless otherwise specified. Furthermore, term "include" as well as derivative thereof are intended to cover non-exclusive inclusions.

In the description of the present disclosure, it should be noted that unless there are express rules and limitations, the terms such as "mount," "connect," and "bond" should be comprehended in broad sense. For example, it can mean a permanent connection, a detachable connection, or an integrate connection; it can mean a mechanical connection, an electrical connection, or can communicate with each other; it can mean a direct connection, an indirect connection by an intermediate, or an inner communication or an interreaction between two elements. A person skilled in the art should understand the specific meanings in the present disclosure according to specific situations.

Terms used herein is for the purpose of describing the particular embodiments. Unless specified or limited otherwise, the singular forms like "a" used herein are also intended to include the plural. It should be noted that, terms such as "include" and/or "include" used herein are intended to mean the existence of the recited features, integers, steps, operations, units and/or components, and does not exclude the presence or addition of one or more other features, integers, steps, operations, units, components, and/or combinations thereof.

The present invention will be further described below in conjunction with the accompanying drawings and embodiments.

First Embodiment

As shown in FIG. 1, the present embodiment provides a panel sounding display device including a display panel 100 and a vibrating layer 200 disposed within a display region 101 of the display panel 100. The vibrating layer 200 is used for vibrating the display panel 100 to emanate sounds.

In one embodiment, according to the goal of the present invention, an earpiece is hidden in a display panel to make sure the display panel is full-screen. The vibrating layer 200 is integrated inside or embedded into the display panel 100. It should be noted, the vibrating layer 200 may be disposed within any position of the display region 101 of the display panel 100. Specifically, the vibrating layer 200 may be disposed within a position where the earpiece was originally designed to be disposed. That is, the vibrating layer 200 replaces the earpiece which is originally disposed on an upper side of the display panel 100. For instance, for mobile terminals, the vibrating layer 200 is disposed on a position away from a microphone.

It should be noted, in the present invention, the display panel 100 may be a liquid crystal display (LCD) panel or an organic light-emitting diode (OLED) display panel. In the prior art, the LCD display panels may include an one glass solution (OGS) integration an in-cell integration, and an on-cell integration which are distinguished by different ways of structuring a touch control layer. In one embodiment, an on-cell integration LCD panel is taken as an example.

In one embodiment, as shown in FIG. 1, the display panel 100 includes a thin film transistor (TFT) array layer 130 and a color filter 180 which are disposed corresponding to each other. The vibrating layer 200 is disposed on a side of the color filter 180 away from the TFT array layer 130. Material of the vibrating layer 200 is a transparent material.

In one embodiment, as shown in FIG. 1, the vibrating layer 200 is disposed on an upper side, which is away from the TFT array layer 130, of the color filter 180. Specifically, the vibrating layer 200 is disposed on a glass plate of the color filter 180. Furthermore, material of the vibrating layer 200 is a transparent material, so a light transmission portion of the color filter 180 will not be blocked. As a result, influences on display effect of a display panel can be reduced.

In one embodiment, as shown in FIG. 1, the display panel further includes a liquid crystal layer 140 disposed between the TFT array layer 130 and the color filter 180, a top polarizer 150 disposed on an upper side of the color filter 180, a protective glass 160 disposed on the top polarizer 150, and a touch control layer 170. The color filter 180 is disposed on the liquid crystal layer 140. The vibrating layer 200 is disposed on the color filter 180. The touch control layer 170 is disposed between the vibrating layer 200 and the top polarizer 150. In addition, the display panel further includes a backlight module 110 and a bottom polarizer 120.

Regarding the above contents, when the display panel adopts other technology such as the OGS integration or the in-cell integration, the only difference thereof is the position of the touch control layer 170. For example, the touch control layer 170 is integrated inside the protective glass 160 or is embedded into the liquid crystal layer 140. The position of the vibrating layer 200 will not make influences on its vibrating effect on the entire display panel. As a result, the technical solution provided by the present invention has exceptional adaptability.

Figure 5:
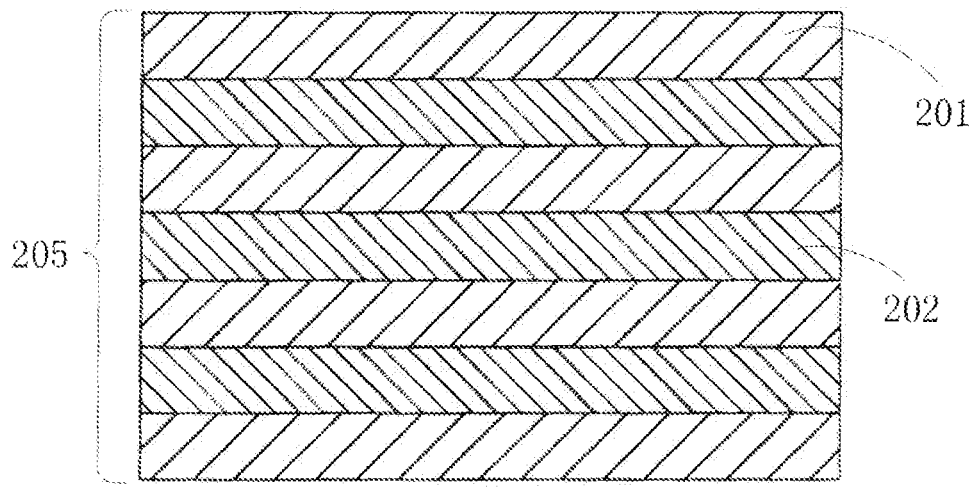
FIG. 5 is a schematic structural diagram of a vibrating layer according to a panel sounding display device provided by an embodiment of the present invention.

In one embodiment, as shown in FIG. 5, the vibrating layer 200 includes a sub-activating layer 205. The sub-activating layer 205 includes a plurality of sub-electrode layers 201. A sub-piezoelectric layer 202 is disposed between each adjacent pair of the sub-electrode layers 201. A voice production technique of the vibrating layer 200 is known in the prior art. When alternating current is applied to one of the sub-electrode layers 201, the sub-piezoelectric layer 202 will vibrate up or down, thereby vibrating the entire display panel, emanating sounds, and realizing a sound on panel technology.

Specifically, material of the sub-electrode layer 201 may be one of Ag, Al, Mo, Au, Cr, Ni, Cu, Pt, or combinations thereof. Material of the sub-electrode layer 201 may also be indium tin oxide (ITO). In one embodiment, material of the vibrating layer 200 is a transparent material. Specifically, material of the sub-electrode layer 201 is ITO.

Regarding the above contents, material of the sub-piezoelectric layer 202 may be piezoelectric ceramic transducer (PZT), aluminum nitride (AlN), poly (vinylidene fluoride) (PVDF), or a polyvinylidene fluoride trifluoroethylene P(VDF-TrFE) copolymer. In one embodiment, material of the vibrating layer 200 is a transparent material. Specifically, material of the sub-piezoelectric layer 202 is PVDF which has a certain light transmission rate.

It should be noted, as shown in FIG. 5, in the present invention, the sub-activating layer 205 includes the plurality of sub-electrode layers 201. The sub-activating layer 205 includes four layers of the sub-electrode layers 201, for example. Apparently, compared to a conventional structure with double layers or other structure, a structure, which has multi-layers, provided by the present invention has greater vibrational displacement, which can better transfer energy generated by the vibration to the entire display panel to emanate sounds.

Figure 6:
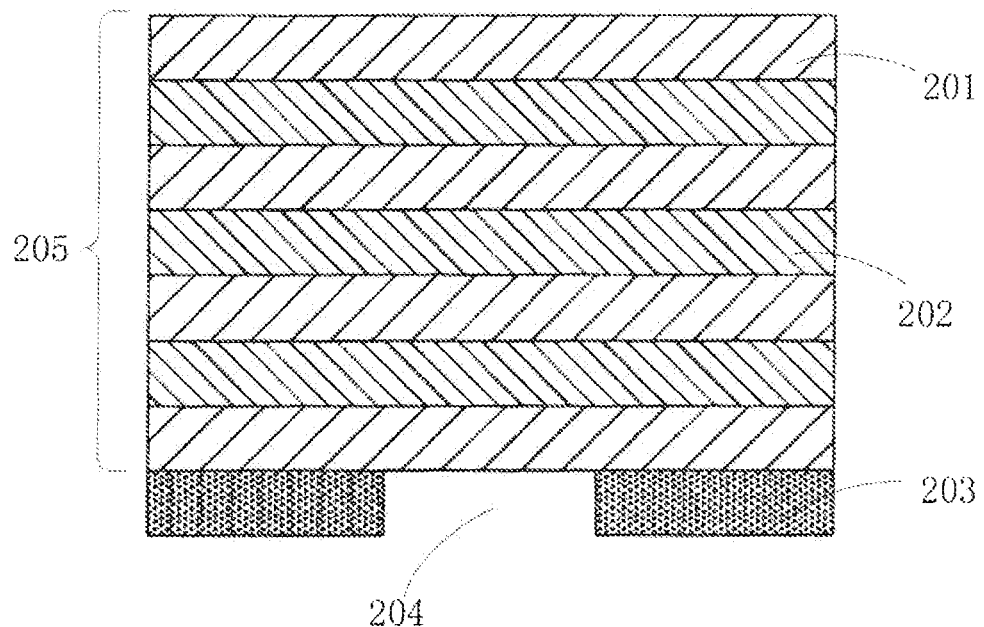
FIG. 6 is another schematic structural diagram of a vibrating layer according to a panel sounding display device provided by an embodiment of the present invention.

In one embodiment, as shown in FIG. 6, the vibrating layer 200 further includes a sub-insulating layer 203. The sub-activating layer 205 is disposed on the sub-insulating layer 203. A plurality of through holes 204 are defined in a middle portion of the sub-insulating layer 203. A side of the vibrating layer 200 near the sub-insulating layer 203 is attached to a functional layer of the display panel to seal the through holes 204 to form a cavity.

It should be noted, material of the sub-insulating layer 203 may be transparent or non-transparent, which is decided according to an actual requirement. Material of the sub-insulating layer 203 are known by those skilled in the art.

Regarding the above contents, a plurality of through holes 204 are defined in a middle portion of the sub-insulating layer 203. A side of the vibrating layer 200 near the sub-insulating layer 203 is attached to a functional layer of the display panel to seal the through holes 204 to form a cavity. In one embodiment, the side of the vibrating layer 200 near the sub-insulating layer 203 can be away from the color filter 180, or can be near the color filter 180. Specifically, the side of the vibrating layer 200 near the sub-insulating layer 203 is attached to the color filter 180 of the display panel to seal the through holes 204 to form a cavity. Apparently, when vibrating layer 200 emanates sounds by vibration, the above structures can extend a vibrating time of the sub-activating layer 205. Therefore, vibrating sound effect of the display panel is improved.

In addition, it should be noted that the vibrating layer 200 may include a plurality of vibration outputs instead of being limited to include only one vibration output. The vibrating layer 200 having multiple outputs will be illustrated in later embodiments. Although a structure with single vibration output has advantages such as simple manufacturing process and low cost, a structure with multiple vibration outputs can achieve a better vibrating sound effect.

To sum up, in the present invention, a vibrating layer is disposed on a side of a color filter, which will not affect structures and manufacturing processes of other functional layers. Manufacturing processes of the vibrating layer and the display panel are simple. Further, material of the vibrating layer is a transparent material, so influences on the display panel caused by embedment of the vibrating layer into the display panel are reduced. Moreover, the vibrating layer is a multi-layer structure, which has a greater vibrational displacement, which can better transfer energy generated by the vibration to the entire display panel to emanate sounds.

Second Embodiment

Figure 2:
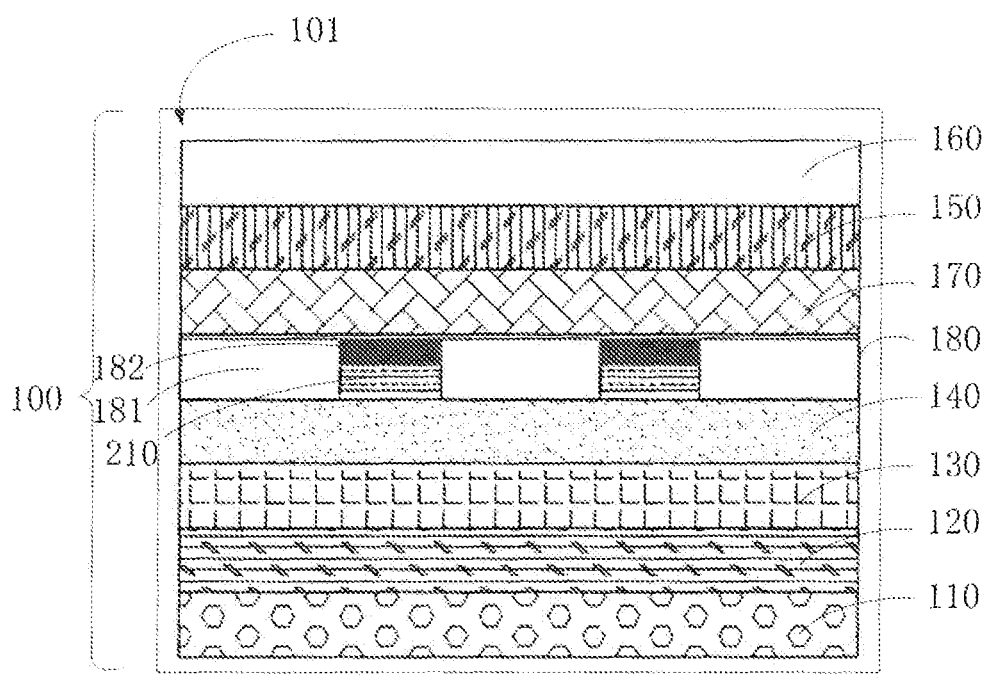
FIG. 2 is a schematic structural diagram of another panel sounding display device provided by an embodiment of the present invention.

Differences between the present embodiment and the above embodiment are the position and the structure of a vibrating layer 200. In one embodiment, as shown in FIG. 2, the vibrating layer 200 includes a plurality of vibrating units 210 arranged in an array. The display panel includes a color filter 180. The color filter 180 includes a plurality of color resists 181 arranged in an array and a plurality of black matrices 182. Each of the black matrices 182 is disposed between each adjacent pair of the color resists 181. Each of the vibrating units 210 is disposed between each adjacent pair of the color resists 181 and is disposed on the same side as the black matrices 182. A projection of the black matrices 182 in a direction perpendicular to the color filter 180 covers a projection of the vibrating layer 200 in a direction perpendicular to the color filter 180.

It should be noted, the vibrating layer 200 having the plurality of vibrating units 210 arranged in an array is embedded into the color filter 180. Specifically, each of the vibrating units 210 is disposed between each adjacent pair of the color resists 181 and is disposed on the same side as the black matrices 182. As shown in FIG. 2, specifically, each of the vibrating units 210 is disposed under each of the black matrices 182 and replaces a portion of the black matrix 182 where light can't be transmitted. Apparently, a projection of the black matrices 182 in a direction perpendicular to the color filter 180 covers a projection of the vibrating layer 200 in a direction perpendicular to the color filter 180. Light path and display effect of the display panel will not be affected by the above structure. An aperture of the display panel remains unaffected.

In addition, it should be noted that the layered structure of the vibrating units 210 may include the sub-electrode layer 201 and the sub-piezoelectric layer 202. Moreover, based on a structure with the vibrating layer 200 of one embodiment, material of the sub-electrode layer 201 and the sub-piezoelectric layer 202 may be variously combined. Preferred material is one that has the best performance.

In one embodiment, a vibration control integrated circuit (not shown) is disposed in the display panel. The vibration control integrated circuit is electrically connected to each of the vibrating units 210. It should be noted, a structure where the plurality of vibrating units 210 arranged in an array are disposed on the vibrating layer 200 is one type of the above structures where a plurality of vibration outputs are disposed on the vibrating layer 200. Furthermore, the vibration control integrated circuit can precisely control input voltages of the vibrating units 210 to control their vibrations for the display panel to emanate sounds by vibration. By the above method, the vibration of the display panel can be more uniform, and the power consumption of the display panel can be lower.

It should be noted, as shown in FIG. 2, structure and other functional layers have already been described in the above embodiment, and will not be described again here.

To sum up, in the present invention, each of the vibrating units is disposed between each adjacent pair of the color resists and is disposed on the same side as the black matrices. That is, the vibrating layer is disposed in a middle portion of the display panel, which is beneficial for vibrating the entire display panel to emanate sounds. An aperture ratio of the display panel remains unaffected. Further, the vibrating layer includes a plurality of vibrating units arranged in an array, so the vibration outputs can emanate sounds precisely. The vibration of the display panel can be more uniform, and the consumption of the display panel can be lower.

Third Embodiment

Figure 3:
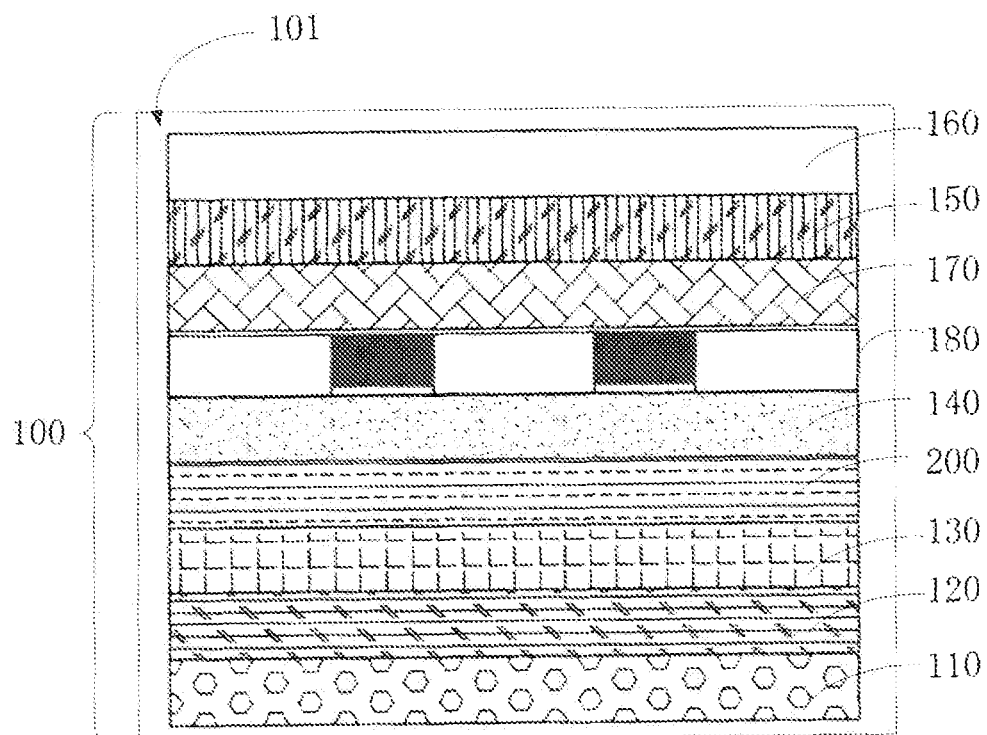
FIG. 3 is a schematic structural diagram of yet another panel sounding display device provided by an embodiment of the present invention.

Differences between the present embodiment and the above embodiments are the position and the structure of a vibrating layer 200. In one embodiment, as shown in FIG. 3, the display panel includes a thin film transistor (TFT) array layer 130. The TFT array layer 130 includes a gate electrode layer 131. Each of the vibrating units 210 is disposed on the TFT array layer 130 and corresponds to the gate electrode layer 131. A projection of the gate electrode layer 131 in a direction perpendicular to the TFT array layer 130 covers a projection of the vibrating layer 200 in a direction perpendicular to the TFT array layer 130.

It should be noted, typically, material of the gate electrode layer 131 is a non-transparent material. In one embodiment, a projection of the gate electrode layer 131 in a direction perpendicular to the TFT array layer 130 covers a projection of the vibrating layer 200 in a direction perpendicular to the TFT array layer 130. The vibrating layer 200 includes a plurality of vibrating units 210 arranged in an array, and each of the vibrating units 210 corresponds to positions of gates of the gate electrode layer 131. The above structure will not affect a light path and display effect of the display panel, and will not affect an aperture ratio of the display panel.

In one embodiment, the TFT array layer 130 is a top-gate TFT array layer. The TFT array layer 130 includes a substrate 132, a TFT 1301, a pixel electrode layer 137, a planarization layer 138, and a common electrode layer 139 which are sequentially disposed on each other. Specifically, the TFT 1301 includes a source electrode layer 133, a drain electrode layer 134, a sub-gate insulating layer 135, a gate electrode layer 131, and a sub-insulating layer 136. Apparently, a specific structure of the TFT array layer 130 is known in the prior art, and will not be described here. Each of the vibrating units 210 is disposed on the common electrode layer 139.

Figure 4:
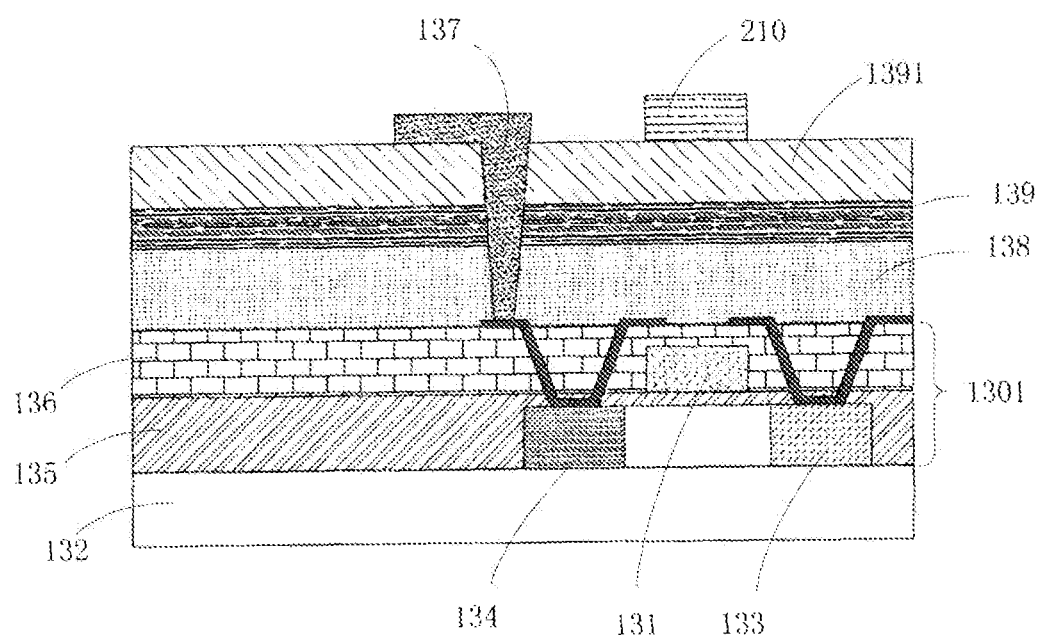
FIG. 4 is a schematic structural diagram of a thin film transistor array layer and vibrating layer in FIG. 3.

It should be noted, each of the vibrating units 210 of the vibrating layer 200 may be directly electrically connected to the vibration control integrated circuit by the common electrode layer 139, thereby integrating connecting wires with controlling wires of the TFT array layer 130. Space for arranging wires is saved because the wires are more compact overall. In addition, each of the vibrating units 210 of the vibrating layer 200 may not be directly connected to a common electrode. As shown in FIG. 4, a protective layer 1391 is disposed on the common electrode layer 139, and each of the vibrating units 210 of the vibrating layer 200 is disposed on the protective layer 1391, thereby avoiding crosstalk between the vibrating layer 200 and the common electrode.

It should be noted, as shown in FIG. 3, structures and other functional layers of the display panel have already been described in the above embodiments, and will not be described again here.

In summary, in the present invention, the vibrating layer 200 is disposed on the TFT array layer 130 and corresponds to the gate electrode layer 131. An aperture ratio of the display panel will not be affected. Further, the vibrating layer 200 includes a plurality of vibrating units 210 arranged in an array, so the vibration outputs can emanate sounds precisely. The vibration of the display panel can be more uniform, and the consumption of the display panel can be lower.

In addition, structures and disposing methods of the vibrating layer 200 of the present invention may be used in an organic light-emitting diode (OLED) display panel, which makes the OLED display panel lighter and thinner, and makes the OLED display panel easier to vibrate and emanate sounds. A structure of the OLED display panel becomes simpler because it does not have a liquid crystal layer. As a result, the sound on panel technology will not have influences on deflection of liquid crystals. Specific implementation has already been described in the above embodiments, and will not be described again here.

The present invention provides a panel sounding display device. A vibrating layer is embedded into a display panel. Compared to a conventional method that disposes the vibrating layer under a display panel, a panel sounding structure provided by the present invention does not need to provide a space for the vibrating layer. Therefore, thickness of the entire display panel is apparently reduced, and assembly of the display panel will not be affected. In addition, performance of the panel sounding display device can be further improved by embedding the vibrating layer into the display panel.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:
1. A panel sounding display device, comprising:
a display panel; and
a vibrating layer disposed within a display region of the display panel;
wherein the vibrating layer is used for vibrating the display panel to emanate sounds;
the vibrating layer comprises a sub-activating layer, and the sub-activating layer comprises a plurality of sub-electrode layers; and
a sub-piezoelectric layer is disposed between each adjacent pair of the sub-electrode layers.
2. The panel sounding display device of claim 1, wherein the vibrating layer comprises a plurality of vibrating units arranged in an array.

3. The panel sounding display device of claim 2, wherein the display panel comprises a color filter, and the color filter comprises a plurality of color resists arranged in an array and a plurality of black matrices;
  wherein each of the black matrices is disposed between each adjacent pair of the color resists; and
  wherein each of the vibrating units is disposed between each adjacent pair of the color resists and is disposed under the black matrices.

4. The panel sounding display device of claim 3, wherein a projection of the black matrices in a direction perpendicular to the color filter covers a projection of the vibrating layer in a direction perpendicular to the color filter.

5. The panel sounding display device of claim 2, wherein the display panel comprises a thin film transistor (TFT) array layer, and the TFT array layer comprises a gate electrode layer; and
  wherein each of the vibrating units is disposed on the TFT array layer and corresponds to the gate electrode layer.

6. The panel sounding display device of claim 5, wherein a projection of the gate electrode layer in a direction perpendicular to the TFT array layer covers a projection of the vibrating layer in a direction perpendicular to the TFT array layer.

7. The panel sounding display device of claim 5, wherein the TFT array layer comprises a substrate, a TFT, a pixel electrode layer, a planarization layer, and a common electrode layer which are sequentially disposed on each other; and
  wherein each of the vibrating units is disposed on the common electrode layer.

8. The panel sounding display device of claim 1, wherein the display panel comprises a thin film transistor (TFT) array layer and a color filter which are disposed correspondingly to each other;
  wherein the vibrating layer is disposed on a side of the color filter away from the TFT array layer; and
  wherein material of the vibrating layer is a transparent material.

9. The panel sounding display device of claim 8, wherein the display panel further comprises a liquid crystal layer disposed between the TFT array layer and the color filter, a top polarizer disposed on the color filter, a protective glass disposed on the top polarizer, and a touch control layer;
  wherein the color filter is disposed on the liquid crystal layer, and the vibrating layer is disposed on the color filter; and
  wherein the touch control layer is integrated inside the protective glass; or
  wherein the touch control layer is disposed between the vibrating layer and the top polarizer; or
  wherein the touch control layer is embedded into the liquid crystal layer.

10. The panel sounding display device of claim 1, wherein the vibrating layer further comprises a sub-insulating layer, and the sub-activating layer is disposed on the sub-insulating layer.

11. The panel sounding display device of claim 10, wherein a plurality of through holes are defined in a middle portion of the sub-insulating layer; and
  wherein a side of the vibrating layer near the sub-insulating layer is attached to a functional layer of the display panel to seal the through holes to form a cavity.

12. The panel sounding display device of claim 11, wherein material of the sub-piezoelectric layer is lead zirconate titanate, aluminum nitride, polyvinylidene fluoride, or a polyvinylidene fluoride trifluoroethylene copolymer.

13. The panel sounding display device of claim 12, wherein material of the sub-electrode layer is metal or indium tin oxide.

* * * * *